Jan. 19, 1965    D. A. SUTHERLAND ETAL    3,166,356
BALANCE WEIGHT DISTRIBUTOR

Filed Jan. 16, 1964    2 Sheets-Sheet 1

INVENTOR.
CLARK E. BOVEIA
DELBERT A. SUTHERLAND
BY Balduin and Martin

Jan. 19, 1965  D. A. SUTHERLAND ETAL  3,166,356
BALANCE WEIGHT DISTRIBUTOR

Filed Jan. 16, 1964  2 Sheets-Sheet 2

INVENTOR.
CLARK E. BOVEIA
DELBERT A. SUTHERLAND
BY Baldwin and Martin

3,166,356
BALANCE WEIGHT DISTRIBUTOR
Delbert A. Sutherland, 276 S. County Road, Palm Beach, Fla., and Clark E. Boveia, Indian River Drive, Rockledge, Fla.
Filed Jan. 16, 1964, Ser. No. 338,070
5 Claims. (Cl. 301—5)

The present invention relates to balance weight distributors for attachment to annular members for automatic balancing thereof when rotating, and especially to an annular unit adapted for attachment to an automobile tire rim, for automatic dynamic balancing of the tire and wheel assembly when rotating.

Heretofore there have been various efforts made to provide dynamic balancing for units such as automobile tire and wheel assemblies, and many of such units as used commercially today comprise a plurality of separate weights that are permanently attached to the metal wheel at the off-balance portions thereof so as to balance the wheel when in use. While some of such wheels are dynamically balanced, the majority of wheel balancing actions performed today are provided by a static balance action.

In all events, while these wheels may be balanced under the then existing conditions, and normally when the wheel is taken from the vehicle, this wheel can be positioned in many instances on the automobile in such a manner that the tire and wheel assembly is almost immediately out of balance due to the positioning thereof on the vehicle. Furthermore, the automobile wheel and tire assembly are subjected to severe impacts, jars and abrasions when in use so that though the wheel may be balanced fairly well when initially assembled on the vehicle, even after a few miles of operation, the wheel may be thrown severely out of balance because of any of a variety of factors and forces acting thereon when in use. Tire experts recommend that wheels (and tires) be rebalanced every several thousand miles.

It is a well known fact that the use of tires when out of balance greatly adds to the heat generated in the tire and wheel assembly and these tire and wheel assemblies, when out of balance, do not provide desirable riding characteristics, nor do the tires thereon provide satisfactory mileage in use and may wear out prematurely due to flat spots or other wear conditions set up thereon or developing therein when in use.

Automatic balancers for rotating members are known, but, none to our knowledge have been found to be economical to manufacture and yet commercially successful for long period use on automobile wheel assemblies and the like. Among the known types are these having a hollow annular member in which suitable weights are housed and which are co-axially secured to the tire rim as by suitable metal clips. Our experience has shown that whereas under certain conditions automatic balancers of this type adequately function during use to balance the wheel assembly, under other conditions, the balancers are inadequate and frequently contribute to the unbalanced condition. For example, we have ascertained that a balancer having a hollow annular nylon member housing a plurality of steel balls that are free to move about in the hollow and which is similar to that hereinafter described, suitable functions as an automatic balance weight distributor for a tire and wheel assembly during humid weather, but, fails to properly function during dry weather. We have aso ascertained the cause of this to lie in static electrical charges that build up under normal driving conditions. Our investigations indicate that when the annular weight housing member of the balancer is made from electrical non-conductive material and the housed weight components are made of magnetizable material, the latter become magnetized when the balancer is in use. This causes the weights to attract one another and thereby assume distributed positions in the housing member that are offset from the desired positions for the proper wheel balancing effect. The problem appears to be especially prevalent when spaced electrically conductive attaching components are employed for securing the hollow member to the wheel rim. It is believed under such circumstances that the static charges generated under driving conditions concentrated in the attaching components and establishes a static field between the components and the inside of the annular member in the area of each component, and it has been postulated in view of our relatively simple solution to the problem, that the magnetizable weight components become magnetized when they strike one another within such a field. It is believed that because of this phenomena and the desire on the part of manufacturers to use readily available and cheap materials in the construction of such balancers that previous balancers have met with little commercial success.

A general object of the present invention is to provide a novel and improved automatic and dynamic wheel balancing unit adapted to be attached to an automobile wheel assembly so as to provide automatic and continuous wheel balancing action thereon when rotated.

Another object of the invention is to provide an improved automatic wheel balancer for automobile wheel assemblies and which is capable of continuous wheel balancing action during use and can be constructed from materials that could not otherwise be successfully combined in such a balancer because of the electrical potentials that build up during use of the vehicle.

Another object is to provide an automatic wheel balancer of the hollow ring type for automobiles that enables the ring to be constructed from readily available electrically non-conductive materials such as nylon, polyethylene, teflon and other such electrically non-conductive plastic materials which are normally easy to fabricate.

Another object of the invention is to provide an automatic wheel balancer of the hollow ring weight housing type for automobile wheels that permits the ring to be constructed from readily available electrically non-conductive material and the housed weights from a material which may be rendered magnetic.

Another object of the invention is to provide a balance weight distributor which is economical to manufacture for attachment to an automotive wheel assembly and where the balance weight distributor is provided with electrically conductive means for maintaining the potential within the housing for the weights effectively the same as that of the tire rim to which it is attachable.

A further object of the invention is to provide a balance weight distributor which will maintain an automotive wheel assembly having a rubber tire, in a dynamically balanced condition for all reasonable out of balance conditions existing, and which will provide a cool riding automobile tire and wheel assembly, for example, so as to aid in obtaining maximum milage from the tire in the balanced tire and wheel assembly.

A further object of the invention is to provide a balance weight distributor that is permanent in action and has no severe operating wear or stresses incurred therein over a long period of use so as to provide economy in wheel balancing action and to provide a continuous comfortable ride for a vehicle to the wheels of which the automatic balance weight distributors of the invention are attached.

Further objects of the invention are to provide an automatic wheel balancing unit providing safety in the balanced wheels to assure maximum traction of the wheels on the road under all driving conditions, to provide an automatically balanced wheel for reducing wear on the tires, shock absorbers, spring and chassis parts; to provide a wheel balancer that provides automatic balanced wheels for assuring smooth rides and reduced steering wheel vibration as well as one which reduces car and chassis vibrations to a minimum; to provide balancing elements for attachment by a unit of the invention to an annular member wherein the elements are maintained in position by centrifugal forces and inertia forces in the wheel for automatic dynamic balancing action therein; to provide balancing elements for a wheel in which the quantity of the balancing elements and sizes thereof are adapted to be varied to compensate for the size and other characteristics of the wheel or annular member with which the unit of the invention is associated; and to provide a balance weight distributor which is relatively simple and economical to build and is easily attached to an annular member for association therewith.

The foregoing and other advantages of the invention will be made more apparent as the specification proceeds.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
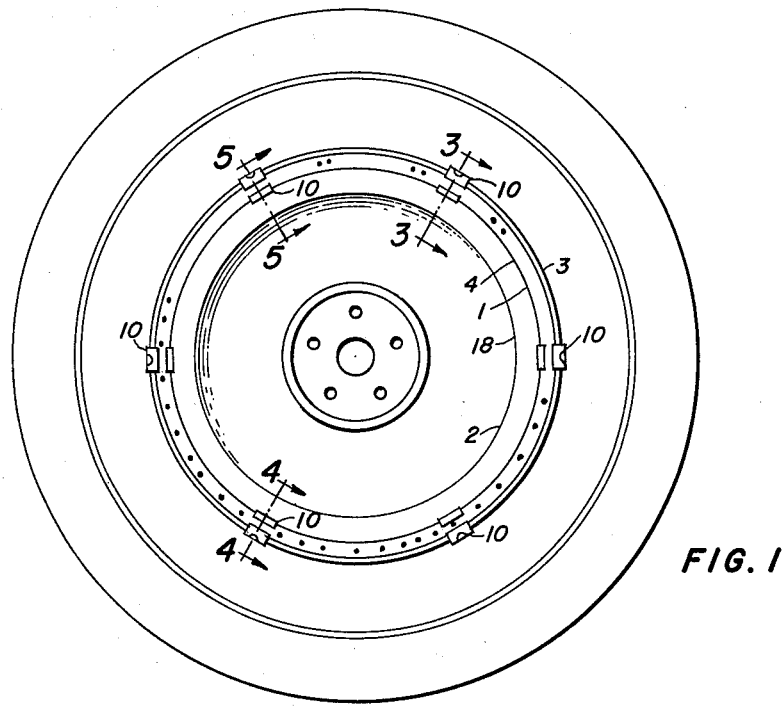
FIG. 1 is a side elevation of a rubber tire and wheel assembly having a balance weight distributor embodying the principles of the invention secured thereto.
Figure 3:
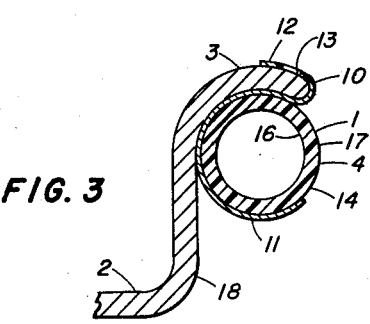
Figure 5:
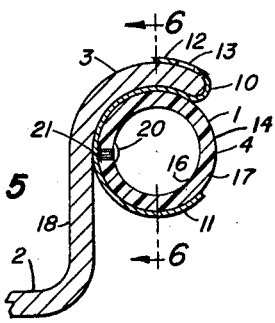
Figure 4:
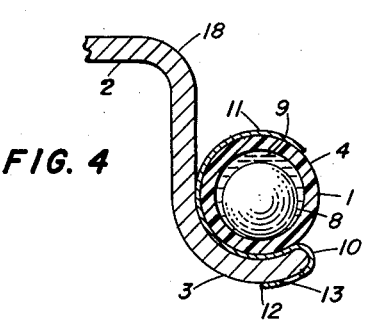

FIGS. 3 and 4 are fragmentary enlarged sections taken on lines 3—3 and 4—4 of FIG. 1; and FIG. 5 is a fragmentary enlarged section along the lines 5—5 of FIG. 1.

Figure 6:
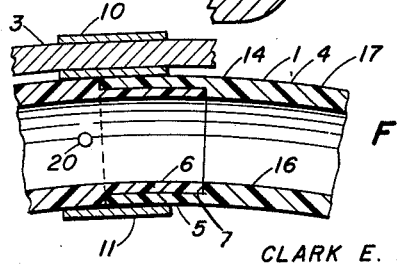

FIG. 6 is a section view along the lines 6—6 of FIG. 5 and shows the joint between the ends of the tube adjacent the rivet.

Figures 7, 8:
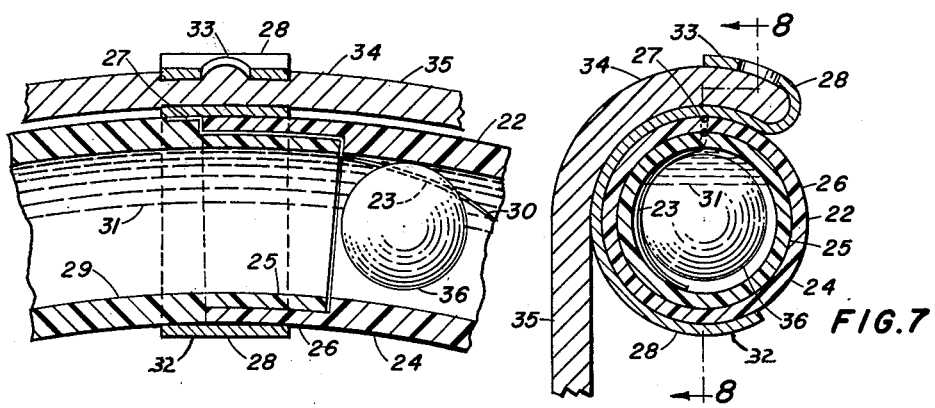

FIG. 7 is a fragment of another embodiment of the invention, as seen in transverse section through the splice in the annular member, the balancer of FIG. 7 being illustrated in a position of attachment to a tire rim of a wheel assembly and further illustrating the position of the liquid and the position which one of the weights may assume under wheel balancing conditions during use.

FIG. 8 is a sectional view along the lines 8—8 of FIG. 7.

The present invention, generally speaking, relates to a balance weight distributor for attachment to an automotive tire wheel assembly for automatic balancing thereof when the assembly is rotating, and where the balance weight distributor comprises a hollow ring having an electrically non-conductive wall and which may be made from a relatively rigid and electrically non-conductive tube formed to a diameter to engage the radially inner surface of a rim flange of a metal wheel, a plurality of metal balls of magnetizable material positioned in the tube for free rolling movement therein and which metal balls are preferably appreciably greater in diameter than one-half the internal diameter of the tube to retain the metal balls in a single row within the tube. The invention further relates to a distributor having means such as a plurality of metal clips operatively engaging the ring for securing it, for example, to the radially inner surface of the wheel rim flange of the tire wheel assembly, whereby the metal wheel when it is being rotated is balanced by the metal balls automatically moving to wheel balancing positions. The invention also includes the provision of electrically conductive means within the tube and electrically conductive means engaging the tube and extending from the inside thereof to the outside thereof to provide a discharge path for static electricity generated in the wheel and ring when being rotated so that the metal balls of magnetizable material do not become magnetized upon striking one another during use.

Attention is now particularly directed to the details of the embodiment shown in FIGS. 1–6. A balance weight distributor embodying the invention is indicated as a whole by the numeral 1. The balance weight distributor is secured in the illustration to a conventional metal wheel 2 of an automobile tire wheel assembly 18 and which has a conventional wheel, or rim flange 3 shown thereon.

It is a feature of the invention that the balance weight distributor primarily comprises a hollow ring or hollow annular member 4 that can be made from a relatively rigid electrically non-conductive plastic tube, the ring being formed to a diameter less than the maximum diameter of the wheel 2 and preferably of a size as to be received snugly within the margins of the rim or wheel flange 3. The ring 4 can be formed from a suitable plastic or similar material which is normally electrically non-conductive, for example, a nylon plastic has been found very satisfactory for use in practice of the invention as it can be formed readily to tubular cross section and then the ends of lengths of such tube can be conveniently secured together to form the hollow ring for housing the balance weights. Polyethylene plastic can be similarly formed. End portions of the tube forming this ring preferably are cut, or ground, or otherwise shaped of reduced thickness, either tapered, or not, as desired and indicated at 5 and 6 in the drawings so that such ends can be overlapped with each other and be secured together by means, such as a cement 7, to retain the hollow of the ring 4 in desired endless form.

Figure 2:
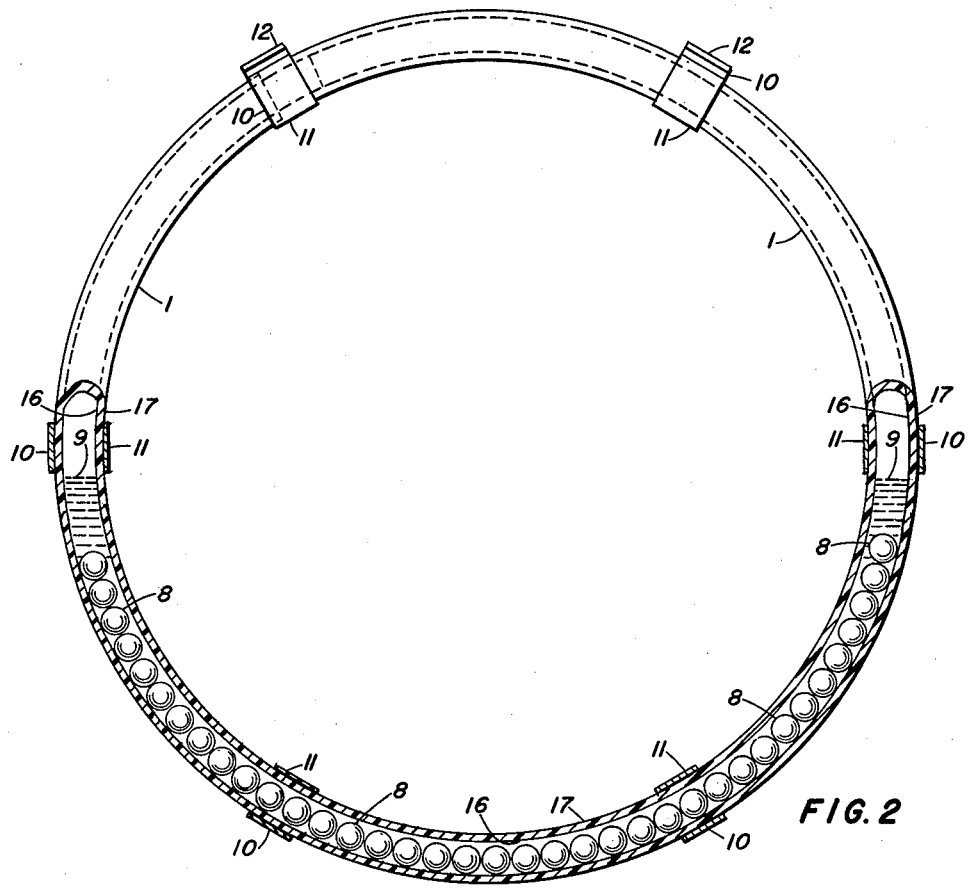
FIG. 2 is an enlarged elevation of the other side of the balance weight distributor of FIG. 1 as seen when detached from the assembly, certain portions thereof being broken away and shown in section to show the general internal construction of such distributor.

The improved balance weight distributor of the invention also includes a plurality of metal balls 8 that are made from magnetizable metal and that are disposed in and free to move about in the hollow of the ring 4. These balls are of a diameter appreciably greater than one-half of the internal diameter of the tube so as to keep the metal balls in a single row within the tube, as shown in FIG. 2. Preferably the internal diameter of the tube, for example, could be 3/8", and the diameter of the metal balls then, for example, would be approximately 5/16" so that there is no possibility of the balls becoming jammed in the tube comprising the ring 4 and so the balls will freely roll from one portion of the tube to another, when in use.

A liquid 9 is provided within the tube forming the ring 4 to cushion the action of the balls. Such liquid 9 and the balls 8 are present within the hollow ring 4 so as to occupy up to substantially 180° length of the ring 4, although a smaller quantity of balls and liquid can be used in the balance weight distributor when maximum balancing action is not required in the tire wheel assembly to which the ring is to be secured. One suitable liquid is glycerin that serves to keep the apparatus of the invention substantially noiseless when in use. Preferably, this glycerin has a small amount of tap water present therein to render it electrically conductive for reasons indicated hereinafter. Other materials could be used in the ring 4, such as ethylene glycol, and again a small amount of tap water normally would be present in the liquid for conductive purposes, or in some instances, it may be desirable to use small amounts of graphite in such liquid to make it conductive and possibly, where noise is not a factor, only a small quantity of graphite, for example, would be present within the ring 4 in addition to the balls 8. Usually it is desirable that the liquid within the tube be made from a material that will not freeze under normal operating conditions.

The metal balls 8 are preferably made from mild steel or other easily formed metal that will retain the balls of round contour over a long service life and will not permit the balls to become severely worn, or to get out of round under normal service conditions. Usually the balls do not require any special finishing action, such as would be required for roller bearings, for example. The balls 8 used in the unit of the invention may be of the type called burnishing balls which do not have any finishing action, such as case hardening, provided thereon and which balls may not be completely geometrically spherical in shape. One feature of the invention lies in permitting the balls to be made of less costly magnetizable materials such as mild steel without encountering the difficulties with magnetization heretofore mentioned.

The drawings clearly show that a plurality of spaced metal clips 10 are used for securing the ring 4 to the internal surface of the wheel or rim flange 3. These clips 10 include an arcuate section 11 of appreciably over 180° in length for engaging the ring 4 at its exterior surface 17 and a reversible bent C-shaped portion 12 is also formed on each of the clips 10 to be secured to the edge of the rim flange 3, as indicated in the drawings, whereby the clips 10 effectively secure the ring 4 to the rim flange 3 of the automotive wheel assembly to position the balance weight distributor of the invention in operative engagement with the wheel 2. It will be seen that these sections 11 preferably extend around the radially inner and radially outer surfaces of the ring 4 to aid in securing it fixedly in place. Usually the clips 10 have an aperture 13 provided in the C-shaped portion 12 thereof to facilitate removal of the clips 10, when desired, from engagement with the rim flange 3, by the use of a suitable removable tool.

While FIG. 2 shows the balance weight distributor of the invention at rest, the dots shown in FIG. 1 in the ring 4 indicate the approximate positioning of the balls 8 when applied to an annular member that was rotated on a test machine and the distributed positions of the balls in the ring 4 noted to show the balancing action obtained in such specific balancing action.

In accord with the invention, electrically conductive means is provided for establishing a flow path through the electrically non-conducting or insulating wall 14 of the ring so as to provide a path for the flow of static electricity between the interior surface 16 and exterior surface 17 of the ring wall 14 and to the wheel 2 of assembly 18. In the embodiment illustrated in FIGS. 1–6, an electrical conductive member such as a rivet 20 is secured in the wall 14 of the ring 4 so as to extend through the wall thereof from the inside hollow defining surface 16 to the outer surface 17 of the wall. Rivet 20 is secured in the wall 14 adjacent the end 5 of the tube by a suitable tool before the ends of the tubes are secured together and is provided in the illustration with heads at its opposite ends. The outer head 21 is countersunk in the exterior surface of wall 14 and engages one of the clips 10 when the balancer is attached to the wheel 2 so as to provide an electrical connection with the wheel assembly.

By providing a conductive liquid in the hollow of the annular weight housing member, all of the metal balls in the ring 4 are electrically connected to the flow path provided by rivet 20 when the balancer is in use and regardless of the distribution of the balls in the hollow during such use.

As an alternative, the cement 7 used in securing the ends 5 and 6 together may be electrically conductive and applied to the ends of the tube ring during the assembly of the ring and in a manner such as to provide a continuous conductive path for static electricity from the interior surface to the exterior surface of the ring wall 14. One such cement available on the market today is Eastman 910 sold by the Eastman Kodak Company. Such cement is useful for securing plastic non-conductive materials together and is electrically conductive.

While we do not understand exactly all of the forces functioning on the balance weight distributors of the invention as to obtain the desired automatic and continuous wheel balancing action provided by the structure of the invention, tests have been performed on various annular members with or without the units of the invention associated therewith. By such tests, it has been established that the balance weight distributors of the invention give very satisfactory, automatic balancing action on automobile wheels. Road tests indicate that the problems we attribute to static electricity are solved by electrically connecting the wheel assembly and the interior of the ring. Usually the balance weight distributors of the invention would be secured to the axially inner flange 3 of an automobile wheel so as to hide them from view, and not to interfere with the attachment of a wheel cover, for example, to the wheel flange. It is believed that the kinetic energy and inertia forces applied to the balance weight distributor when the wheel 2 is rotating provides the desired automatic balancing action. The unit of the invention maintains a balancing action even though the unbalance of the annular member changes in use and even though the ring and balls are made from electrically non-conductive and magnetizable materials respectively.

It will be realized that the ring 4 will vary in diameter dependent upon the size of the annular member or wheel to which it is secured. Usually the ring should be just slightly less than the maximum diameter of such annular member to provide maximum kinetic balancing action in the desired unit. Naturally with increasing diameters of the ring 4, the internal diameter of the tube forming the ring can be increased and the weight of the balls, and the number of balls provided in the unit can be varied and increased on, for example, a larger diameter rim such as would be used on trucks, or the like. Other weights may be fixedly attached to the annular member if it is severely out of balance to partially overcome the unbalance before securing a unit of the invention thereto.

By use of the balance weight distributor of the invention, the automatic balancing action on the automobile wheel for example, that can be obtained provides for a cooler running tire and that fact, together with the balancing of the tire when in use and under changing conditions, provides for maximum service, or mileage from the automobile tires positioned on the wheel 2. The unit of the invention is relatively economical to produce, but, yet will give a long service life, and even can be changed from vehicle to vehicle, as desired. Thus, it is believed that the objects of the invention have been achieved.

FIGS. 7 and 8 illustrate still another embodiment of the invention. In this case an electrically conductive wire 23 made for example, from copper metal, is sealed in the wall 24 of the hollow annular weight housing member 22 between the lapped and cemented ends 25, 26 of the tube used in its fabrication. The outer end 27 of the ring is forced into the surface of the wall at the exterior surface of the ring wall 24 by the pressure of the attached clip 28, whereas the other end 30 of the wire 23 may project into the hollow 29 of the ring 22 to encounter the electrically conductive liquid 31 therein. Wire 23 in this instance provides the path for current flow between the interior and exterior surfaces of the hollow ring. Clip 28 is like clip 10 and has an arcuate section 32 that engages the ring 22 at its exterior surface and a return bend 33 that engages the rim flange 34 of the wheel 35. FIGS. 7 and 8 also indicates the position the liquid assumes under the centrifugal forces applied thereto when the device is in use. It, of course, is understood that the hollow member houses a plurality of balls 36, one of the balls being shown in a position it may assume under an unbalance condition of the wheel assembly.

While more than one embodiments of the invention have been disclosed herein, it will be appreciated that modification of these particular embodiments of the invention may be resorted to without departing from the scope of the invention as defined in the appended claims.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention. This application is a continuation-in-part of subject matter contained in patent application S.N. 219,557, filed August 27, 1962 and entitled Balance Weight Distributor, and which is now abandoned.

What is claimed as new and what it is desired to secure by Letters Patent of the United States is:

1. In an automatic wheel balancer, the improvement comprising a hollow annular member having an electrically non-conductive wall, said wall having an interior surface defining said hollow and an exterior surface, means engaging said member at said exterior surface for securing said member to an automotive wheel, a plurality of magnetizable metal weight components disposed and free to move about in said hollow to automatically balance the automotive wheel upon rotation thereof, and electrically conductive means establishing a flow path for static electricity between the interior surface of said wall and the automotive wheel.

2. In an automatic wheel balancer, the improvement in accord with claim 1 wherein said electrically conductive means includes said means engaging said member.

3. In an automatic wheel balancer, a hollow annular member having an electrically non-conductive wall, said wall having an interior surface defining said hollow and an exterior surface, means including an electrically conductive metal clip engaging said member at said exterior surface for securing said member to an automotive wheel, a plurality of magnetizable metal balls disposed and free to move about in said hollow to automatically balance the automotive wheel upon rotation thereof, an electrically conductive means extending through said wall and establishing a flow plath for static electricity between the interior surface of said wall and said clip.

4. In an automatic wheel balancer, the improvement comprising a hollow annular member having an electrically non-conductive wall, said wall having an interior surface defining said hollow and an exterior surface, means including an electrically conductive metal component engaging said member at said exterior surface for securing said member to an automotive wheel, a plurality of magnetizable metal balls disposed and free to move about in said hollow to automatically balance the automotive wheel upon rotation thereof, electrically conductive means engaging said component and extending through said wall for establishing a flow path for static electricity between the interior of said wall and said clip; and electrically conductive liquid means disposed in and partly filling the hollow of said annular member.

5. In an automatic wheel balancer, the improvement comprising a hollow annular member having an electrically non-conductive wall, said wall having an interior surface defining said hollow and an exterior surface, means engaging said member at said exterior surface for securing said member to an automotive wheel, a plurality of magnetizable metal weight components disposed and free to move about in said hollow to automatically balance the automotive wheel upon rotation thereof, and electrically conductive means establishing a flow path for static electricity between the interior surface and the exterior surface of said wall.

References Cited in the file of this patent

UNITED STATES PATENTS

| | | |
|---|---|---|
| 1,314,005 | Louden | Aug. 26, 1919 |
| 2,137,416 | Rubsam | Nov. 22, 1938 |
| 2,153,199 | Miller | Apr. 4, 1939 |
| 2,417,079 | Kavanaugh | Mar. 11, 1947 |
| 2,687,918 | Bell | Aug. 31, 1954 |
| 2,737,420 | Wilborn | Mar. 6, 1956 |
| 2,771,240 | Gurin | Nov. 20, 1956 |
| 2,801,883 | Householder | Aug. 6, 1957 |
| 2,825,587 | Barta | Mar. 4, 1958 |
| 2,888,406 | Bondley | May 26, 1959 |
| 3,006,690 | Pierce | Oct. 31, 1961 |